Patented Sept. 29, 1931

1,824,831

UNITED STATES PATENT OFFICE

PAUL NAWIASKY AND ARTUR KRAUSE, OF LUDWIGSHAFEN-ON-THE-RHINE, GERMANY, ASSIGNORS TO GENERAL ANILINE WORKS INC., OF NEW YORK, N. Y., A CORPORATION OF DELAWARE

PRODUCTION OF BLUE DYESTUFFS OF THE HALOGENATED ANTHRACENE SERIES

No Drawing. Application filed March 28, 1929, Serial No. 350,812, and in Germany July 25, 1928.

The present invention relates to the production of blue dyestuffs of the anthracene series which contain halogen.

We have found that valuable blue derivatives of N-dihydro-1,2,2′,1′-anthraquinoneazine are very easily obtained by acting upon 1,2,2′,1′-anthraquinoneazine, suspended in sulphuric acid containing water, with a halogen hydride. Generally speaking the sulphuric acid used should contain between about 20 and 80 per cent of water. Sulphuric acid of 50 to 75 per cent strength is particularly advantageous. Instead of the halogen hydrides, salts of the same which split off halogen hydride by the action of the sulphuric acid used, may be employed with advantage. The reaction proceeds so readily that the employment of elevated pressure by working in closed vessels, which is advantageous or even necessary in other methods of combining 1,2,2′,1′-anthraquinoneazine with halogen hydrides, can be dispensed with. The halogenation products of the N-dihydroanthraquinoneazine are obtained in a particularly pure state when pure azine, which is obtainable, for example as described in our copending application for Patent Ser. No. 350,811 filed March 28, 1929, by treatment of commercial N-dihydroanthraquinoneazine in sulphuric acid solution with manganese dioxide, is employed as the initial material. In this case the manufacture of the pure 1,2,2′,1′-anthraquinoneazine and the conversion of the same into halogenated N-dihydro-1,2,2′,1′-anthraquinoneazine can be carried out in one operation. The reaction proceeds according to the following equation:

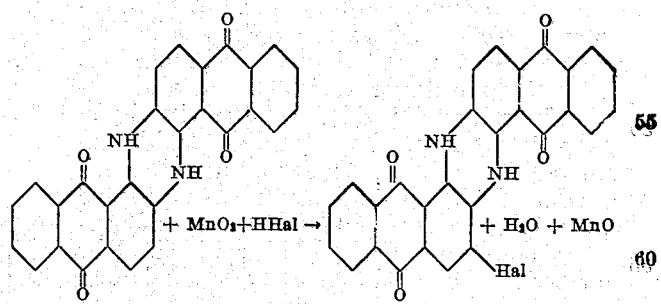

The following examples will further illustrate the nature of this invention, but the invention is not restricted thereto. The parts are by weight.

Example 1

5 parts of 1,2,2′,1′-anthraquinoneazine obtainable according to "Berichte der Deutschen Chemischen Gesellschaft" volume 36, page 3434, are suspended in 100 parts of 60 per cent sulphuric acid. 35 parts of a saturated solution of common salt are then allowed to drop slowly into the suspension at from 95° to 100° C. The whole is stirred for 2 hours at from 95° to 100° C., and finally a pure blue suspension is obtained. The whole is diluted with water, filtered, washed with water and the dyestuff is then worked up in the usual manner.

Example 2

100 parts of Indanthrene Blue RS (see G. Schultz, Farbstofftabellen 1923, No. 837) or another N-dihydro-1,2,2′,1′-anthraquinoneazine of a similar degree of purity are dissolved in 1000 parts of sulphuric acid of 66° Baumé. 50 parts of water are then slowly poured in and then at from 50° to 60° C. a suspension of 40 parts of native pyrolusite in 200 parts of sulphuric acid of 66° Baumé are added. The whole is stirred for 5 hours at about 60° C., cooled to about 30° C. and then 800 parts of oleum containing 23 per cent of $SO_3$ are added, whereby part of the separated azine passes into solution. Then while stirring vigorously at a temperature below 30° C. 800 parts of a concentrated solution of common salt are allowed to run in slowly. The whole is then heated to about 95° C. and another 600 parts of common salt solution are allowed to run in slowly at a temperature above 95° C. The whole is then kept for about 2 hours at from 95° to 100° C. until no further change in the blue color of the suspension can be detected. The whole is then diluted with water and the dyestuff is worked up as described in Example 1. The dyestuff is a chlorinated N-dihydroanthraquinoneazine which dyes cotton particularly pure shades having comparatively very good fastness to chlorine.

*Example 3*

30 parts of pure N-dihydro-1,2,2′,1′-anthraquinoneazine, such as is obtainable for example according to the U. S. Patent No. 1,541,156, are dissolved in 600 parts of sulphuric acid of 66° Bé. strength, whereupon 12 parts of natural manganese dioxide are introduced at between 25° and 30° centigrade. After an hour, the mass is diluted with 300 parts of ice and 500 parts of concentrated hydrochloric acid are added. The mixture is boiled under a reflux condenser, while stirring, until a pure blue paste is formed, which takes about an hour, diluted with water and worked up as described in Example 1.

*Example 4*

10 parts of the N-dihydro-1,2,2′,1′-anthraquinoneazine used in Example 2 are dissolved in 100 parts of sulphuric acid of 66° Bé. 5 parts of water are slowly added and then a suspension of 6 parts of natural manganese dioxide in 30 parts of 90 per cent sulphuric acid, whereupon the mass is heated for about 6 hours to between 65° and 70° centigrade. The mixture is cooled to about 30° centigrade, and 80 parts of fuming sulphuric acid containing 23 per cent of $SO_3$ are added in order to dissolve the partly separated azine. Thereupon the solution is diluted with 120 parts of water and heated to between 90° and 100° centigrade. At a temperature above 95° centigrade, 150 parts of a 10 per cent aqueous solution of sodium bromide are run in, and the mass is stirred for about 2 hours at between 95° and 100° centigrade, until the reaction is complete. The resulting product is diluted with water and worked up as described in Example 1. The dyestuff contains bromine and has tinctorial properties similar to those of the product described in Example 1.

What we claim is:

The process which comprises acting on impure N-dihydro-1,2,2′,1′-anthraquinoneazine with sulphuric acid and manganese dioxide and treating the resulting product, suspended in sulphuric acid of from 50 to 80 per cent strength, with a halogen hydride.

In testimony whereof we have hereunto set our hands.

PAUL NAWIASKY.
ARTUR KRAUSE.